Nov. 4, 1969  N. B. KELL  3,475,994

VEHICLE SPEED CONTROLLED CARBURETOR ACCELERATOR PUMP

Filed Feb. 8, 1968

INVENTOR.
Nathaniel B. Kell

BY

E. J. Biskup
ATTORNEY

United States Patent Office 3,475,994
Patented Nov. 4, 1969

3,475,994
VEHICLE SPEED CONTROLLED CARBURETOR ACCELERATOR PUMP
Nathaniel B. Kell, Indianapolis, Ind., assignor to General Motors Corporation, Detroit, Mich., a corporation of Delaware
Filed Feb. 8, 1968, Ser. No. 704,146
Int. Cl. F02m 7/08, 37/06, 69/02
U.S. Cl. 74—857                                                           4 Claims

ABSTRACT OF THE DISCLOSURE

A control linkage for an accelerator pump of a carburetor wherein an extensible link foreshortens the pumping stroke of the accelerator pump proportional to the speed of the vehicle.

---

The usual flow-type carburetor on internal combustion engines includes a mechanical accelerator pump, operatively connected to the throttle linkage, for injecting additional fuel into the carburetor induction passage during acceleration of the vehicle. The additional gasoline assures a fuel mixture of sufficient richness to maintain combustion when the throttle is suddenly opened. This additional fuel, proportional to the amount of throttle opening, is injected every time the throttle moves toward the open position. There are, however, instances where the full pumping stroke of the accelerator pump is not required in order to maintain satisfactory operation of the vehicle. For example, in heavy, fast moving traffic, such as found on modern expressways, a sudden closing followed immediately by a re-opening of the throttle to the same point without an appreciable loss of vehicle speed can be done without requiring the full stroke of the accelerator pump inasmuch as the air has sufficient velocity to pick up sufficient fuel from the main jet of the carburetor to properly maintain the combustion. Additional fuel is only required when the opening of the throttle exceeds that degree of opening required to continue the speed at which the vehicle is moving. Thus, it follows that the additional amount of fuel required is greater at lower vehicle speeds and progressively lessens as the speed of the vehicle increases.

Accordingly, the present invention contemplates a means for regulating the amount of fuel injected by the accelerator pump in direct relationship to the vehicle speed. This is accomplished by varying the length of a link in the accelerator pump control linkage which, in turn, decreases the stroke of the pump an amount proportional to the speed of the vehicle. In this connection, the majority of the automobiles are produced with automatic transmissions which include a hydraulic control governor that produces a hydraulic pressure proportional to the vehicle speed. The extensible link of the present invention includes a pair of relatively slidable links operatively connected between the throttle control linkage and the accelerator pump with an expandable bellows interposed between the slidable links and fluidly connected to the hydraulic control governor. Therefore, as the speed of the vehicle increases, the pressure produced by the governor is transmitted to the bellows to expand the latter and foreshorten the effective length of the extensible link. This, in turn, foreshortens the pumping stroke of the accelerator pump and, consequently, reduces the amount of fuel injected into the carburetor induction passage if the throttle is suddenly opened and closed. Thus, increased fuel economy is realized without an appreciable decrease in engine performance.

The objects of the present invention are: to provide an accelerator pump for the carburetor of a motor vehicle wherein the pumping stroke is reduced proportionately to the speed of the vehicle; to provide a control linkage for the accelerator pump of a vehicle carburetor wherein an extensible link foreshortens the discharge stroke of the pump an amount proportional to the speed of the vehicle; to provide a control linkage for the accelerator pump of a carburetor wherein an expandable bellows, operatively connected to a source of fluid pressure proportionate to the speed of the vehicle, foreshortens the effective length of one of the links thereby reducing the discharge stroke of the accelerator pump an amount proportional to vehicle speed; and to provide a link for controlling the pumping stroke of an accelerator pump for a motor vehicle carburetor wherein relatively slidable links, operatively connected between the throttle linkage and the accelerator pump are varied in effective length by an expandable bellows fluidly connected to a source of hydraulic pressure proportional to the speed of the vehicle.

These and other objects will be apparent to one skilled in the art upon reading the following detailed description, reference being made to the accompanying drawings in which.

Figure 1:
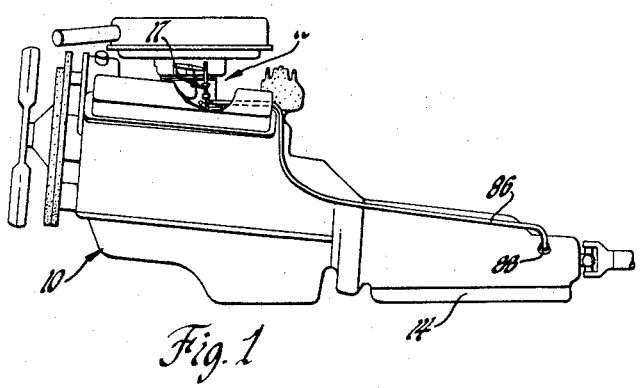
FIGURE 1 is a side elevational view of an internal combustion engine having an associated automatic transmission and provided with the extensible accelerator pump control linkage made in accordance with the present invention.
Figure 2:
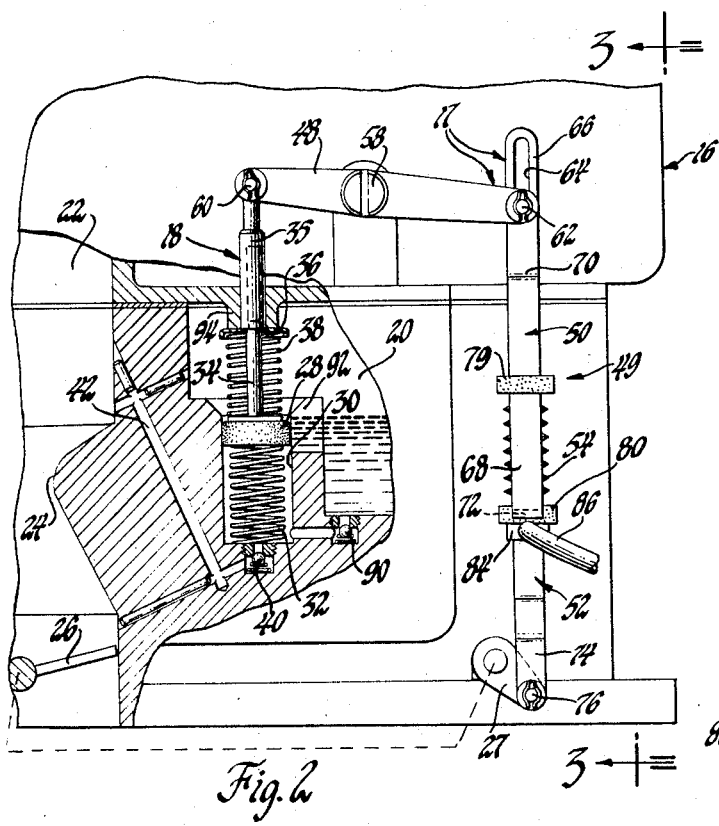
FIGURE 2 is an enlarged partially sectioned side view showing the carburetor of FIGURE 1 provided with an extensible control linkage made in accordance with the present invention.
Figure 4:
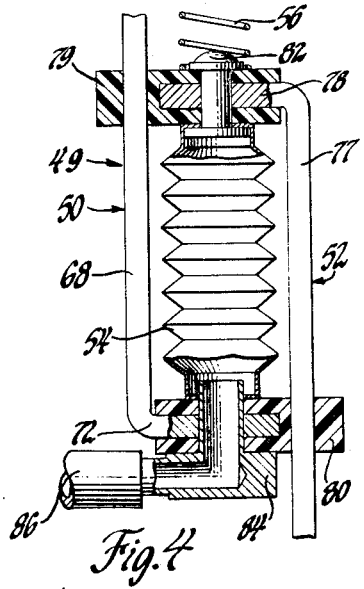
FIGURE 4 is an enlarged partial cross-sectional view of the portion of the extensible link shown in FIGURE 3.

Referring to FIGURE 1, there is shown a conventional internal combustion engine 10 associated with an automatic transmission 14 and including a carburetor 16 provided with an accelerator pump control linkage 17. As more clearly shown in FIGURE 2, the carburetor 16 includes a conventional accelerator pump, generally indicated at 18, a constant level fuel chamber 20, an induction passage 22, a main venturi 24 and a throttle valve 26. The throttle valve 26 is shown schematically operatively connected to a throttle shaft lever 27, which, in turn, is operatively connected to a conventional throttle linkage, not shown. The exact details of the throttle linkage depend, to a large extent, on the type of carburetor employed, and those skilled in the art will be able to clearly understand the present invention without elaboration on this feature.

The accelerator pump 18 may be of the type shown and described in Olsen et al., U.S. Patent No. 2,711,282, issued Nov. 20, 1956. More specifically, the accelerator pump 18 includes a piston 28 slidably mounted in pumping chamber 30 and a coiled spring 32, interposed between piston 28 and the bottom of the pumping chamber 30, and tends to bias the former in a upwardly direction or pump charging position. The piston 28 is rigidly connected to an upwardly extending piston rod 34. The upper end of the piston rod 34 is telescopically received within an axial bore formed in a pump shaft 35. An annular shoulder cap 36 is slidably attached to the piston rod 34. A coil spring 38, interposed between the cap 36 and the piston 28, tends to bias the former into axial engagement with the lower end face of the pump shaft 35 and the latter in a downwardly direction or pump discharge position. The accelerator pump functions in a well known manner wherein, as the pump shaft 35 is moved downwardly, the piston rod 34 telescopes within the pump shaft 35 thereby compressing the coil spring 38. Thus, the piston 28 does not immediately follow the movement of the pump shaft 35 but rather gradually descends within the pump chamber 30 as the spring 38 gradually expands to balance the force of the spring 32. This pumping action discharges the fuel entrapped beneath the piston 28 through a normally closed ball check valve 40 and through a discharge passage 42 into the induction passage 22.

The accelerator pump 18 is operatively connected to the throttle shaft lever 27 by the accelerator pump control linkage 17 which comprises a rotatably supported lever 48, an extensible link 49 including a first link 50 and a second link 52, an expandable bellows 54 and a coil spring 56. The lever 48 is rotatably supported intermediate its end portions on the carburetor 16 by a pivot connection 58. One end of the lever 48 is pivotally connected to the upper end of pump shaft 35 by pin connection 60 while the other end of the lever 48 is slidably retained at shaft connection 62 within a lost motion slot 64 formed in the upper arm 66 of the first link 50. As more clearly shown in FIGURE 3, the first link 50 also includes a lower arm 68 spaced laterally outwardly from the upper arm 66 by a reversely bent middle section 70. An inwardly turned flange 72 is formed at the lower end of the arm 68 and serves a function to be explained below.

Figure 3:
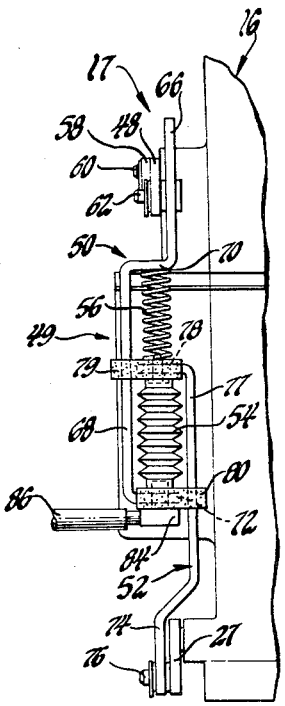
FIGURE 3 is a view taken along line 3—3 of FIGURE 2.

As shown in FIGURE 3, the second link 52 includes a lower arm 74, pivotally connected to the throttle shaft lever 27 at connection 76, and a laterally inwardly spaced upper arm 77 terminating with an outwardly turned flange 78. It will be noted that the second link 52 is laterally offset from the first link 50 and the two links are interconnected for relative movement by an upper slide block 79 and lower slide block 80 both of which preferably are formed from a plastic material such as nylon. The respective blocks are fixedly connected along one side to the flanges 78 and 72, and a vertical guide slot, formed adjacent the other side of each block, slidably accommodates the opposing link and permits a differential expansion and contraction of the effective length of the extensible link 49 under the influence of the bellows 54.

The metal bellows 54 is fastened at its upper end to slide block 79 and flange 78 by means of a fastener 82 which sealingly closes the end of the bellows and holds the second link 52 and the upper slide block 79 in assembly relation. The lower end of the bellows 54 is sealingly fastened to the lower slide block 80 and the first link 50 by a conventional elbow fitting 84. The bellows 54 may be of any conventional design although, in the preferred embodiment, a welded bellows having an expansion rate proportional to fluid pressure is utilized.

The spring 56 is compressively retained between the middle section 70 of link 50 and the upper slide block 79 and tends to bias the links to an extended position wherein the bellows 54 is in a contracted position. Thus, it will be seen that, as the bellows 54 expands or contracts, the links 50 and 52 slide relative to each other to increase or decrease the effective distance between pin connection 76 and shaft connection 62.

As shown in FIGURE 1, a flexible conduit 86 is fluidly connected between the elbow fitting 84 and the rear of the transmission 14 at the transmission governor pressure line 88. This governor may be of the type shown and described in Rosenburger, U.S. Patent No. 2,762,384, issued Sept. 11, 1956, wherein the governor develops a hydraulic pressure substantially proportional to the output shaft speed of the transmission 14 which, in turn, is proportional to the speed of the vehicle. In the case of manual transmissions, any device producing a pressure proportional to vehicle speed may be effectively utilized. In the illustrated position shown in FIGURE 2, the various components are shown in a position wherein the throttle valve 26 is closed and the vehicle is at rest. In this position, the bellows 54 is compressed to its minimum length by the biasing effect of spring 56 thereby giving the links 50 and 52 their maximum effective length between connections 62 and 76. In this position, the spring 32 biases the accelerator pump piston 28 to the charging position and the pumping chamber 30 is filled with fuel drawn through the fuel bowl check valve 90 and an inlet passage 92.

While the vehicle is at rest, no pressure exists in the flexible conduit 86. As the throttle valbe 26 is opened, the throttle shaft lever 27 moves in a counterclockwise direction moving links 50 and 52 upwardly and rotating lever 48 counter-clockwise about pivot connection 58. This movement, in turn, shifts the accelerator pump 18 downwardly and injects a metered quantity of fuel through passage 42 into the induction passage 22. Thus, the full stroke of the accelerator pump 18 is available under these conditions.

When the vehicle is travelling at a predetermined speed and the throttle valve 26 is opened sufficiently to maintain this speed, the pressure, developed in the governor 88 and proportional to the vehicle speed, is transmitted through conduit 86 to the bellows 54 thereby expanding the latter a predetermined amount. This expansion vertically slides blocks 79 and 80 away from each other thereby decreasing the effective length of the links and permitting the lever 48 to move clockwise and the accelerator pump 18 upwardly a corresponding amount. Under these operating conditions, if the throttle valve 26 is suddenly closed, the accelerator pump 18 will move upwardly to the charging position shown in FIGURE 2 at which point additional vertical movement will be restrained by the stop collar 36 abutting a boss 94 formed at the top of fuel chamber 20. Thereafter, the lost motion slot 64 will slide downwardly over shaft connection 62 an amount corresponding to the foreshortening of the extensible link 49. The distance of travel within the lost motion slot 64 represents the distance link 50 can move upwardly when the throttle is reopened before the lever 48 and accelerator pump are actuated.

Thus, the speed of the vehicle, by virtue of the pressure developed within bellows 54 by the governor 88, reduces the effective stroke of the accelerator pump 18. When the vehicle is at rest, the full discharge stroke of the pump is available. Thereafter, with increasing vehicle speed, the stroke of the pump is reduced. It is apparent that any reduction of the discharge stroke will reduce the amount of fuel injected into the induction passage 22. In driving, which requires frequent movements of the throttle valve to a closed and then to an opened position while the vehicle maintains a substantially constant speed, the present invention will significantly reduce the amount of fuel normally expended by the accelerator pump when this additional supply of fuel is not needed to maintain combustion or performance of the engine.

The preceeding description is used to illustrate only a preferred embodiment of an extensible control linkage for an accelerator pump. It should be obvious that a repositioning of the components may require an extensible link that increases its effective length in order to decrease the discharge stroke of an associated accelerator pump. It should be understood that all such variations to accommodate the present invention are intended to be the full equivalent of the arrangement previously described. Whatever the specific arrangements may be, the provision of an extensible length that varies the discharge stroke of the accelerator pump proportional to vehicle speed may be successfully incorporated into the arrangement by a person skilled in the art.

Since other changes and modifications will be apparent to one skilled in the art, the scope of the invention, as defined by the appended claims, is intended to cover such alterations of the illustrative embodiment.

What is claimed is:

1. In combination with a motor vehicle having an internal combustion engine, said engine including a carburetor operatively controlled by a throttle linkage, an accelerator pump operatively associated with the carburetor, said accelerator pump movable to cause a pumping action wherein a quantity of fuel is supplied to the carburetor as said throttle linkage is actuated; a control linkage operatively interconnecting said throttle linkage and said accelerator pump, said control linkage comprising: an extensible link operatively connected at one end to the accelerator pump and at the other end to the throttle linkage; said extensible link including means for decreasing said pumping action of said accelerator pump an amount proportional to vehicle speed whereby full pumping action is available when said vehicle is at rest and said throttle linkage is actuated and said pumping action is progressively decreased an amount proportional to vehicle speed when said throttle linkage is actuated while said vehicle is moving.

2. In combination with a motor vehicle having an internal combustion engine, said engine including a carburetor operatively controlled by a throttle linkage; a pressure source proportional to vehicle speed; an accelerator pump operatively associated with the carburetor, said accelerator pump movable to cause a pumping action wherein a quantity of fuel is supplied to the carburetor as said throttle linkage is actuated; a control linkage operatively interconnecting said throttle linkage and said accelerator pump, said control linkage comprising: an extensible link operatively connected at one end to the accelerator pump by a lost motion connection and fixedly connected at the other end to the throttle linkage; said extensible link including a pressure responsive bellows fluidly connected to said pressure source, said bellows adapted to vary the length of the extensible link so as to decrease said pumping action of said accelerator pump an amount proportional to vehicle speed whereby full pumping action is available when said vehicle is at rest and said throttle linkage is actuated, and said pumping action is progressively decreased an amount proportional to vehicle speed when said throttle linkage is actuated while said vehicle is moving.

3. In combination with a vehicle having an internal combustion engine operatively associated with an automatic transmission including a pressure source proportional to the speed of the vehicle, said engine including a carburetor controlled by a throttle linkage and an accelerator pump operatively associated with the carburetor; a control linkage responsive to the speed of the vehicle operatively interconnecting said carburetor and said throttle linkage, said control linkage comprising: a first link having a lost motion connection at one end thereof with the accelerator pump and the other end slidably connected to a second link, said second link slidably connected at one end to the first link and pivotally connected at the other end to the other end to the throttle linkage; pressure responsive means movable between a collapsed and expanded position in response to fluid pressure operatively connected between said links; conduit means fluidly connecting said pressure source with said pressure responsive means; and spring means biasing said pressure responsive means to the collapsed position, whereby a lost motion connection proportional to vehicle speed is established between said accelerator pump and said throttle linkage.

4. In combination with a vehicle having an internal combustion engine operatively associated with an automatic transmission including a pressure source proportional to the speed of the vehicle, said engine including a carburetor controlled by a throttle linkage and an accelerator pump operatively associated with the former; said accelerator pump movable in a pumping action wherein a quantity of fuel is supplied to the carburetor when the throttle linkage is actuated; a control linkage responsive to the speed of the vehicle operatively interconnecting said carburetor and said throttle linkage, said control linkage comprising: a first link operatively connected at one end to the accelerator pump at a lost motion connection and slidably connected at the other end to a second link, said second link slidably connected at one end to the first link and pivotally connected to the throttle linkage; a bellows assembly movable between a collapsed and expanded position in response to fluid pressure operatively connected between the links; conduit means fluidly connecting said pressure source with said bellows; and spring means biasing said bellows to the collapsed position whereby said bellows varies the effective length of the first and second links so that a lost motion connection is established between the accelerator pump and the throttle linkage such that the pumping action is decreased an amount proportional to vehicle speed if the throttle linkage is actuated while the vehicle is moving.

References Cited
UNITED STATES PATENTS

| | | | |
|---|---|---|---|
| 2,230,311 | 2/1941 | Seymour | 123—119 |
| 2,293,792 | 8/1942 | Ball. | |
| Re. 22,742 | 4/1946 | Ericson. | |
| 3,298,675 | 1/1967 | Miano. | |

WENDELL E. BURNS, Primary Examiner

U.S. Cl. X.R.

123—119; 261—34